United States Patent [19]

Ashcraft

[11] Patent Number: 4,476,073
[45] Date of Patent: Oct. 9, 1984

[54] PROCESS AND SYSTEM FOR ORIENTING LAYERED POLYMER FILMS

[75] Inventor: Charles R. Ashcraft, Victor, N.Y.

[73] Assignee: Mobil Oil Corporation, New York, N.Y.

[21] Appl. No.: 454,221

[22] Filed: Dec. 29, 1982

[51] Int. Cl.³ ............................................. B29C 17/02
[52] U.S. Cl. ........................................ 264/25; 26/71; 26/72; 156/229; 156/272.2; 264/288.4; 264/290.2
[58] Field of Search ...................... 264/25, 171, 210.5, 264/288.4, 290.2; 26/51, 71, 72; 156/229, 272.2

[56] References Cited

U.S. PATENT DOCUMENTS 2,804,652  9/1957  Balkan ................................... 264/25
4,022,646  5/1977  Cosey ................................... 156/229
4,283,453  8/1981  Siefried ............................... 156/229

*Primary Examiner*—James B. Lowe
*Attorney, Agent, or Firm*—A. J. McKillop; M. G. Gilman; J. F. Powers, Jr.

[57] ABSTRACT

Method and system for orienting a multilayer polymeric film structure by differentially heating the films so that orientation at their respective optimal temperatures is achieved.

8 Claims, No Drawings

PROCESS AND SYSTEM FOR ORIENTING LAYERED POLYMER FILMS

The present invention relates to the orientation of multilayer films. More particularly, the invention relates to the orientation of polymer films having different optimum orientation temperatures.

The uniaxial and biaxial orientation of plastic products is a common commercial operation. Such orientation improves the physical properties of plastics such as, flexibility, Elmendorf tear strength, elongation, tensile-strength, Mullen burst strength, impact strength and cold strength properties. The desired orientation is accomplished by subjecting the polymeric film to longitudinal and/or transverse tensile stress at a temperature somewhat above the second order transition temperature or the glass transition temperature thereof. A problem is encountered when orienting a multi-layer film structure of different polymeric films, for example, a film composed of a polypropylene layer bonded by an adhesive to an ethylene vinyl alcohol copolymer film which in turn is adhesively bonded to a second polypropylene film. The core layer, i.e. the copolymer, has a higher softening point than the polypropylene film and, thus, the structure must be heated above the ideal or optimum orientation temperature for the polypropylene film. On orientation this will result in either a hazy film with less than optimum physical properties or a film with little or no orientation or, worst case, being a non-processible film, which is to say, a film so hot that it splits during orientation, resulting in no film at all.

It is, therefore, an object of this invention to provide a method and system for orienting multi-layer films having at least two layers each of which are optimally orientable at difference temperatures.

It is another object of the present invention to provide a method and system for biaxially orienting multi-layer films whose layers are individually orientable at different temperatures.

SUMMARY OF THE INVENTION

This invention relates to a system for orienting a multi-layered film structure of (1) at least one polymeric layer optimally orientable at a comparatively low temperature and (2) at least one other polymeric layer optimally orientable at a comparatively higher temperature and being capable of being heated to said higher temperature by microwave heating means; said system comprising in combination:

(a) means in association with said film structure for heating said structure to said comparatively low temperature;

(b) microwave heating means in association with said film structure adapted to heat said layer (2) to said comparatively higher temperature while not substantially, directly increasing the temperature of layer (1); and (c) means in association with said film structure for orienting said structure while a temperature differential exists between said layer (1) and layer (2), said differential being of a magnitude at least generally corresponding to that between said comparatively low and said comparatively higher temperatures.

The invention also relates to a system for biaxially orienting the above identified multi-layered film structure; said system comprising in combination:

(a) first heating means in association with said film structure for heating said structure to a first comparatively low temperature;

(b) first microwave heating means in association with said film structure adapted to heat said layer (2) to a first comparatively higher temperature while not substantially, directly increasing the temperature of layer (1);

(c) first orienting means in association with said film structure for uniaxial or machine direction orienting said structure while a temperature differential exists between said layer (1) and layer (2), said differential being of a magnitude at least generally corresponding to that between said first comparatively low and said first comparatively higher temperatures;

(d) second heating means in association with said film structure for heating said structure to a second comparatively low temperature;

(e) second microwave heating means in association with said film structure adapted to heat said layer (2) to a second comparatively higher temperature while not substantially directly increasing the temperature of layer (1);

(f) second orienting means in association with said film structure for biaxial or transverse direction orienting said structure while a temperature differential exists between layer (1) and layer (2), said differential being of a magnitude at least generally corresponding to that between said record comparatively low and said second comparatively higher temperatures.

The invention also relates to a process for biaxially orienting the above identified multi-layer structure comprising:

(a) preparing the multi-layered structure comprising said layer (1) and layer (2) in association with each other;

(b) heating said structure to a first comparatively low temperature;

(c) while at said low temperature subjecting said structure to microwave generated energy to heat said layer (2) to a first comparatively higher temperature while not subtantially, directly increasing the temperature of layer (1);

(d) while a temperature differential exists betwen said layer (1) and layer (2), uniaxially or machine direction orienting said structure; said differential being of a magnitude at least generally corresponding to that between said first comparatively low and said first comparatively higher temperatures;

(e) heating said structure to a second comparatively low temperature;

(f) while at said low temperature subjecting said structure to microwave energy to heat said layer (2) to a second comparatively higher temperature while not substantially directly increasing the temperature of layer (1); and (g) while a temperature differential exists between said layer (1) and layer (2) biaxially or transverse direction orienting said structure, said differential being of a magnitude at least generally corresponding to that between said second comparatively low and said second comparatively higher temperatures.

In one preferred embodiment of the invention at least one film of said structure is at least substantially free of polar substituents and at least one other film of said structure contains at least a substantial number of polar substituents. The polar free film can be a polyolefin, for example, polypropylene. The other film or films can be a thermoplastic film containing polar substituents.

DETAILED DESCRIPTION OF THE INVENTION

In coping with the problem addressed by the present invention, that is, the fact that some polymers have an ideal orientation temperature considerably lower than other polymers, this poses a dilemma when it is desired to simultaneously orient a multilayer structure composed of such polymers. The dilemma is solved, according to the present invention, by taking advantage of the observation that microwave energy will cause some polymers to increase in temperature quite rapidly while other polymers will heat, under the same conditions, at best, only slowly. This observation will permit, for example, a dual layer laminate of a polymer which will not respond rapidly to microwave generated energy and a polymer which will respond rapidly by increasing in temperature, to be uniaxially and biaxially oriented while each polymer is at a temperature which is optimal for its orientation. In order to accomplish this result the structure is first heated to a temperature which is the optimum temperature for uniaxial or machine direction orientation of one of the polymers and while at this temperature the other polymer is heated by microwave energy. The laminate is then uniaxially oriented. Thereafter, the temperature of this laminate is brought to or maintained at a temperature which is optimum for the biaxial orientation of the layer which will not rapidly respond to microwave energy and while at this temperature the laminate is subjected to sufficient microwave energy to raise the other layer to a temperature which is optimum for its biaxial orientation. When both layers are at these temperatures, the film is then biaxially oriented and thereafter cooled to below these temperatures.

A magnetron is a diode vacuum tube in which the flow of electrons is controlled by an externally applied magnetic field to generate power at microwave frequencies. Magnetron generated energy falls within the microwave radiation frequency of several hundred megahertz and above range, for example, 612, 1,225, and 2,450 megahertz.

It has been determined that the power requirements for heating certain polar substituent-containing polymer films to orientation temperature are well within the range of commercial microwave ovens. For example, employing a segment of polyvinyl alcohol film measuring $4 \times 4 \times \frac{1}{4}$ inch and using a Thermex 2450 MHz, 2.5 Kw fringing field microwave system the film was heated over a period ranging from 2 to 7 seconds and in this time period the film increased in temperature from 89° F. to 390° F.

Also by way of example, it has been determined that 6.3 Kw of power can heat a 0.8 mil ethylene-vinyl alcohol copolymer layer in a 30 inch wide web travelling at 500 feet/minute to a temperature which is 70° F. above of that of a polypropylene web bonded thereto. This temperature differential will permit the biaxial orientation of both polymers at their respective optimal orientation temperatures.

This is illustrated by the following examples.

EXAMPLE I

A five layer, 30 inch wide film is prepared composed of (1) a 14 mil film of polypropylene homopolymer, (2) a 1.8 mil layer of Plexar 2109 (available from Chemplex Company), a propylene-maleic anhydride graft copolymer adhesive, (3) a 3.5 mil film of ethylene-vinyl alcohol copolymer, (4) a 1.8 mil layer of Plexar 2109 and (5) a 14 mil layer of polypropylene homopolymer. This film is machine direction (MD) oriented at a temperature of about 300° F. using differential speed rollers to produce an MD stretching of 5 times. The MD oriented laminate is then transverse direction (TD) oriented 7 times on a T.M. Long orienter at a temperature of about 375° F. The resulting product will evidence haziness, some holes, thick and thin spots, and, overall, less than optimum physical properties.

EXAMPLE II

A film identical to that in Example I is MD oriented 5 times at 300° F. This film, while preheated to a temperature range of about 312°–320° F., (a suitable temperature for TD orientation of polypropylene) is passed through a microwave application apparatus equipped with slotted wave guides of 1.2 Kw output. The microwave energy is applied for 2 seconds which is sufficient to raise the temperature of the ethylene-vinyl alcohol copolymer film to about 370°–390° F., which is a suitable TD orientation temperature. The laminate is immediately TD oriented on a T.M. Long orienter to an extent of 7 times. The resulting laminate will evidence excellent biaxial orientation and optimum physical characteristics.

It is to be understood that the foregoing example the uni-directional or machine direction orientation can be accomplished by first heating the laminate, for example, by radient heat to a temperature which is optimal for the uniaxial orientation of the polypropylene layer and thereafter while at this temperature the microwave unit can be employed to optimally heat the ethylene-vinyl alcohol copolymer layer to its uniaxial orientation temperature.

Any suitable microwave heating apparatus can be employed in practicing the present invention. A suitable apparatus, for example, is a Model 4055 high intensity fringing field applicator equipped with a 2.5 Kw power source, available from Thermex Inc., Santa Clara, Calif.

In the laminate contemplated by the present invention for biaxial orientation, any orientable film which does not readily increase in temperature in response to microwave energy is contemplated as at least one of the layers thereof. Examples of such films include polyolefin films, e.g. polyethylene, polypropylene, polybutylene, and olefin copolymers, such as, ethylene-propylene copolymers. Any film which is biaxially orientable and which will readily respond to the microwave energy so as to rapidly increase in temperature is contemplated for the other layer of the structures of the invention. Broadly, any polymer containing polar substituents which will respond to such energy and cause the film to rapidly increase in temperature is contemplated. Examples of such films include polyvinylalcohol polymers, ethylene-vinylalcohol copolymers, polyamides, polyethers, polyesters, etc.

It also is contemplated to employ film laminates which respond to microwave energy with an increase in temperature and exhibit a differential in temperature between that of each film, each film being at a temperature which is optimum for its orientation. Thus, the structures to be oriented include laminates of non-polar films with polar films and, in some instances, polar films with polar films.

What is claimed is:

1. A system for orienting a multi-layered film structure of (1) at least one polymeric layer optimally orientable at a comparatively low temperature and (2) at least one other polymeric layer optimally orientable at a comparatively higher temperature and being capable of being heated to said higher temperature by microwave heating means; said system comprising in combination:
    (a) means in association with said film structure for heating said structure to said comparatively low temperature;
    (b) microwave heating means in association with said film structure adapted to heat said layer (2) to said comparatively higher temperature while not substantially, directly increasing the temperature of layer (1); and
    (c) means in association with said film structure for orienting said structure while a temperature differential exists between said layer (1) and layer (2), said differential being of a magnitude at least generally corresponding to that between said comparatively low and said comparatively higher temperatures.

2. A system for biaxially orienting a multi-layered film structure of (1) at least one polymeric layer optimally orientable at a comparatively low temperature and (2) at least one other polymeric layer optimally orientable at a comparatively higher temperature, said other film being capable of being heated to said higher temperature by microwave heating means; said system comprising in combination:
    (a) first heating means in association with said film structure for heating said structure to a first comparatively low temperature;
    (b) first microwave heating means in association with said film structure adapted to heat said layer (2) to a first comparatively higher temperature while not substantially, directly increasing the temperature of layer (1);
    (c) first orienting means in association with said film structure for uniaxial or machine direction orienting said structure while a temperature differential exists between said layer (1) and layer (2), said differential being of a magnitude at least generally corresponding to that between said first comparatively low and said first comparatively higher temperatures;
    (d) second heating means in association with said film structure for heating said structure to a second comparatively low temperature;
    (e) second microwave generated heating means in association with said film structure adapted to heat said layer (2) to a second comparatively higher temperature while not substantially directly increasing the temperature of layer (1);
    (f) second orienting means in association with said film structure for biaxial or transverse direction orienting said structure while a temperature differential exists between said layer (1) and layer (2), said differential being of a magnitude at least generally corresponding to that between said second comparatively low and said second comparatively higher temperatures.

3. The process for orienting a layered structure comprising:
    (a) preparing a multi-layered structure comprising (1) at least one polymeric layer optimally orientable at a comparatively low temperature and in association therewith (2) at least one other polymeric layer optimally orientable at a comparatively higher temperature, and being capable of being heated to said higher temperature by microwave heating means;
    (b) heating said structure to said comparatively low temperature;
    (c) while at said low temperature subjecting said structure to microwave energy to heat said other polymeric film to said comparatively higher temperature; and
    (d) while a temperature differential exists between said layer (1) and layer (2), orienting said structure; said differential being of a magnitude at least generally corresponding to that between said comparatively low and comparatively higher temperatures.

4. The process for biaxially orienting a multi-layer structure comprising:
    (a) preparing a multi-layered structure comprising (1) at least one polymeric layer optimally orientable at comparatively low temperature and in association therewith (2) at least one other polymeric layer optimally orientable at a comparatively higher temperature, and being capable of being heated to said higher temperature by microwave heating means;
    (b) heating said structure to a first comparatively low temperature;
    (c) while at said low temperature subjecting said structure to microwave energy to heat said layer (2) to a first comparatively higher temperature while not substantially directly increasing the temperature of layer (1);
    (d) while a temperature differential exists between said layer (1) and layer (2), uniaxially or machine direction orienting said structure, said differential being of a magnitude at least generally corresponding to that between said first comparatively low and said first comparatively higher temperatures;
    (e) heating said structure to a second comparatively low temperature;
    (f) while at said low temperature subjecting said structure to microwave energy to heat said layer (2) to a second comparatively higher temperature while not substantially directly increasing the temperature of layer (1); and
    (g) while a temperature differential exists between said layer (1) and layer (2) biaxially or transverse direction orienting said structure, said differential being of a magnitude at least generally corresponding to that between said second comparatively low and said second comparatively higher temperatures.

5. The method of claim 4 wherein layer (1) is at least substantially free of polar substituents and layer (2) contains at least a substantial number of polar substituents.

6. The method of claim 5 wherein layer (1) is a polyolefin and layer (2) is a thermoplastic polar substituent-containing polymer.

7. The method of claim 6 wherein layer (2) is a member selected from the group consisting of a polyvinylalcohol, an ethylene-vinyl alcohol copolymer, a polyamide, a polyether and a polyester.

8. The method of claim 7 wherein said structure is bonded together by means of at least one adhesive layer.

* * * * *